(12) United States Patent
McPherson et al.

(10) Patent No.: US 7,603,666 B2
(45) Date of Patent: Oct. 13, 2009

(54) CLASS LOADER

(75) Inventors: Daniel C. McPherson, Raleigh, NC (US); David M. Wendt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 10/869,129

(22) Filed: Jun. 16, 2004

(65) Prior Publication Data

US 2005/0283776 A1 Dec. 22, 2005

(51) Int. Cl.
*G06F 9/44* (2006.01)

(52) U.S. Cl. .................. 717/166; 717/162; 717/164; 717/165; 707/10; 707/100; 707/102; 709/201; 709/202

(58) Field of Classification Search .................. 707/10, 707/100, 102; 717/148, 166, 170; 709/311, 709/315
See application file for complete search history.

(56) References Cited

U.S. PATENT DOCUMENTS

| | | | | |
|---|---|---|---|---|
| 5,062,039 | A * | 10/1991 | Brown et al. | 717/162 |
| 5,752,245 | A * | 5/1998 | Parrish et al. | 707/10 |
| 6,072,953 | A * | 6/2000 | Cohen et al. | 717/166 |
| 6,202,208 | B1 | 3/2001 | Holiday, Jr. et al. | |
| 6,571,388 | B1 | 5/2003 | Venkatraman et al. | |
| 6,993,713 | B2 * | 1/2006 | Wendt | 715/513 |
| 2002/0184226 | A1 | 12/2002 | Klicnik et al. | |
| 2003/0037320 | A1 | 2/2003 | Lovvik et al. | |
| 2003/0101445 | A1 | 5/2003 | Li et al. | |
| 2003/0106043 | A1 | 6/2003 | Bernadat et al. | |
| 2003/0110467 | A1 | 6/2003 | Balakrishnan | |
| 2003/0121031 | A1 | 6/2003 | Fraenkel et al. | |
| 2003/0163481 | A1 | 8/2003 | Blohm | |
| 2003/0167349 | A1 | 9/2003 | Krohn et al. | |
| 2003/0177484 | A1 | 9/2003 | Bosschaert et al. | |
| 2003/0191867 | A1 | 10/2003 | Czajkowski | |
| 2004/0255294 | A1 * | 12/2004 | Spotwood | 717/176 |

OTHER PUBLICATIONS

Braden, R., Lindell, B. Berson, S. Faber, T. . "The ASP EE: an active network execution environment." DARPA Active NEtworks Conference and Exposition, Proceedings 2002(2002): 238-254.*
"Improving Java's Instanceof Operator: Downloading Classes On Demand", *IBM Research Disclosure*, Aug. 1998 (p. 1105-1107) RD v41 n412 Aug. 1998 Article 41266.

* cited by examiner

*Primary Examiner*—Wei Y Zhen
*Assistant Examiner*—Matthew J Brophy
(74) *Attorney, Agent, or Firm*—Marcia L. Doubet

(57) ABSTRACT

A class loader locates, at run time, a requested code component. The code component is preferably stored on a database, rather than in a file system, to improve its accessibility in a network computing environment. Code components are preferably stored in the database using an organizational structure that reflects a code isolation structure. In this manner, different versions of a particular code component can be retrieved in a transparent, automated manner, depending on information associated with the invocation thereof.

9 Claims, 3 Drawing Sheets

FIG. 1A
(Prior Art)

100 — C = Foo.class.getClassLoader()
105 — C.loadClass ("Bar")

CLASS LOADER

RELATED APPLICATIONS

Commonly-owned and co-pending U.S. Patent Applications having Ser. No. 10/644,357, (filed Aug. 20, 2003), titled "Method and System for Compiling Java Code with Referenced Classes in a Workspace Environment"and Ser. No. 10/163,470, (filed Jun. 6, 2002; now U.S. Pat. 6,993,713), titled "Web Content Management Software Utilizing a Workspace Aware JSP Servlet". These related applications are referred to hereinafter as "the first related invention"and "the second related invention", respectively.

FIELD OF THE INVENTION

The present invention relates to computer programming, and deals more particularly with improving the manner in which classes are dynamically loaded during program execution.

DESCRIPTION OF THE RELATED ART

There are a number of approaches to dynamically loading components of executable code (such as classes, plug-ins, bundles, etc.) in modern programming languages. In the Java™ programming language, classes are loaded dynamically, using a class loader, as an application program executes. ("Java" is a trademark of Sun Microsystems, Inc.) The class loader is responsible for searching for a particular class and making that class available to the run-time system if found. Java class loading is based on a delegation model, wherein a class loader first delegates the class loading responsibility to its immediate parent class loader; if that parent class loader cannot find the class, then its ancestor classes are consulted, in turn, to attempt to locate the class. Inheritance in the class loader chain is under control of the programmer, who may specify an explicit parent relationship when creating a new class loader. Each time a class loader is created, it is associated with one or more locations (specified, typically, using the value of a class path variable) where it will be searching for classes.

FIGS. 1A-1B illustrate this prior art dynamic class loading technique with a simple example. Suppose that the following Java code is encountered while running code in the class named "Foo":

ti new Bar( )

That is, a new instance of the class named "Bar" is to be instantiated. Using standard Java class loading, it is first necessary to determine the class loader used to load the invoking class (which, in this example, is the class "Foo"). The Java code element 100 in FIG. 1A illustrates syntax which may be used for this purpose, wherein a variable "C" is assigned to the result of invoking the "getClassLoader" method on the Foo class. That class loader is then used to load the class Bar. Syntax which may be used for this purpose is shown at 105, wherein the method "loadClass" on class loader C is invoked with "Bar" as a parameter.

The flowchart in FIG. 1B illustrates logic with which this loadClass method operates. First, a check is made to see if Bar is already in this loader's cache (Block 120). If so, then it is not necessary to reload the class, and the located value (i.e., the class) is returned (Block 145). Otherwise, a recursive process begins (Block 125) where the parent of the present class loader is asked to load the requested class. Block 130 tests whether the searched-for class was found anywhere in this inheritance chain. If so, control transfers to Block 145 where the located class is then returned.

Otherwise, if the class was not located during the processing of Block 125, the test in Block 130 has a negative result and control reaches Block 135 where the class path for the searched-for class ("Bar", in this example) is determined (using the CLASSPATH variable). A CLASSPATH variable typically specifies a location or locations in a file system. For example, the syntax CLASSPATH=c:
\rootDirectory\subDirectory\classes.jar indicates that a Java Archive, or ".JAR", file is to be searched when a class cannot be located using the class loader inheritance chain.

Block 140 then tests to see if the searched-for class can be located using the class path obtained at Block 135. If so, then the located class is loaded (Block 150) and immediately initialized; otherwise, an error is returned (Block 155). After the class is loaded in Block 150, control returns to Block 145 to return the loaded class to the caller. This dynamic loading technique is well known in the computer programming art, and code to implement the class loader process is commonly provided as part of Java development toolkits.

While this approach to dynamic loading of run-time components suffices in many scenarios, there is room for improvement.

SUMMARY OF THE INVENTION

The present invention provides improved dynamic loading of code components. Simultaneous users of code may access different versions thereof using techniques of the present invention. For example, in a content management scenario, developers can isolate code as it is being revised, such that the code under revision is called during execution of programs run by those developers but a "base" or unrevised version is called during execution of programs run by other users. Techniques disclosed herein may be used advantageously in a clustered server environment.

In one aspect, the present invention provides techniques for improving dynamic loading of code components, comprising: determining that executing code references a code component that is not yet loaded; using a code loader associated with the code component to search for the code component in a workspace associated therewith; and if code component is located in the workspace, loading the located code from the workspace, otherwise loading the code component from a base version thereof.

In another aspect, the present invention provides techniques for loading code components at run time, comprising: one or more content-revision work areas; one or more code components, each of which has a base version and selected ones of which have copies placed in one or more of said content-revision work areas; and a class loader that retrieves one or more code components from one or more of the content-revision work areas, at run time, upon detecting a reference thereto in executing code and determining that the copy of the referenced code component has been placed in the content-revision work area and that retrieves the base version of the referenced code component otherwise, the class loader being adapted for loading the retrieved code components.

In yet another aspect, the present invention provides techniques for loading compiled code, and comprises: determining if a referenced compiled code file is located in a workspace; if so, loading the compiled code file from the workspace and if not, loading the compiled code file from a non-workspace location (e.g., a storage location of a base version of the compiled code file).

The workspaces or content-revision work areas may be located in one or more databases.

The present invention will now be described with reference to the following drawings, in which like reference numbers denote the same element throughout.

DESCRIPTION OF PREFERRED EMBODIMENTS

Figure 1B:
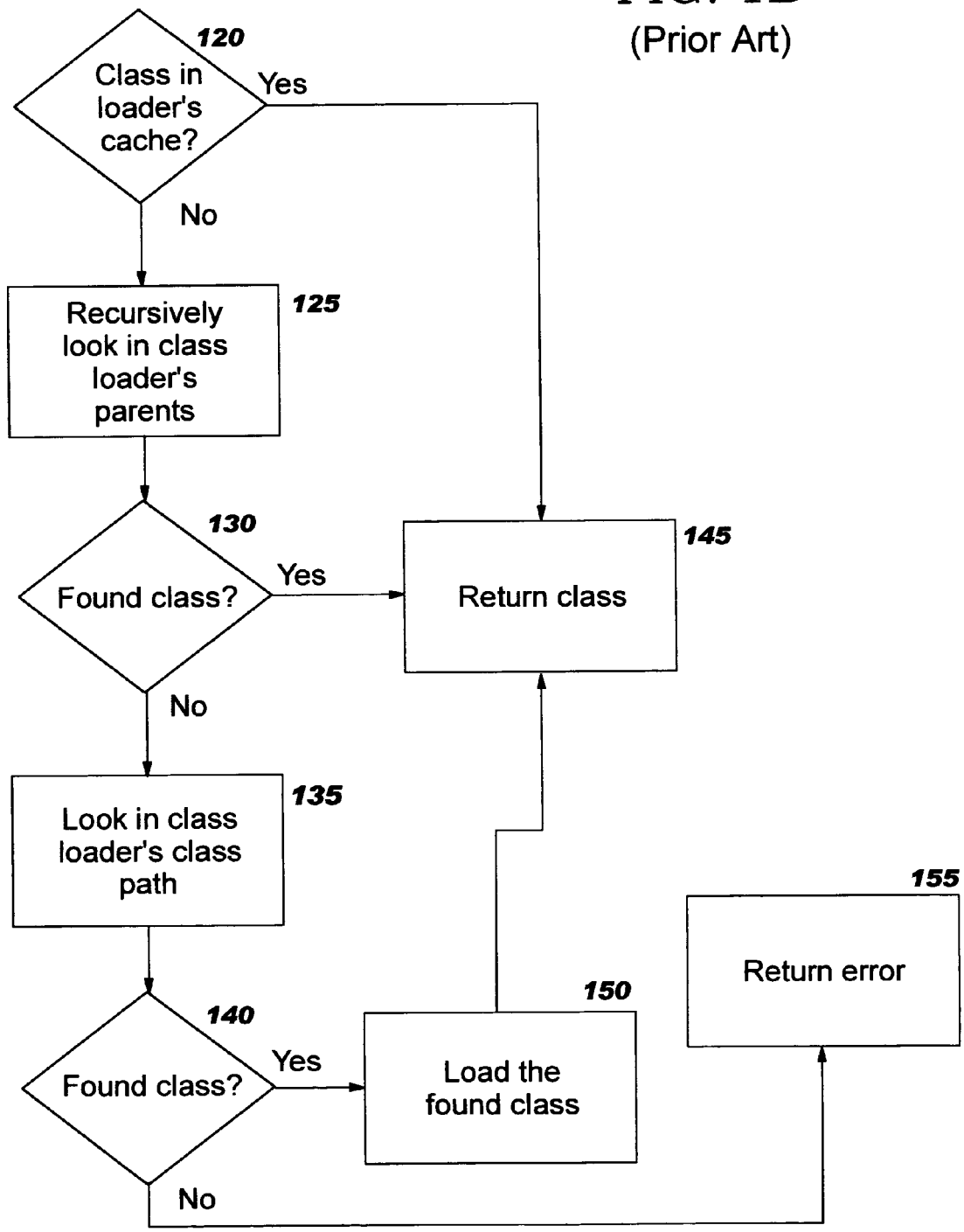
FIG. 1 (comprising FIGS. 1A-1B) illustrates a technique with which Java classes are dynamically loaded according to the prior art.

The present invention defines improved techniques for dynamically loading components (including a single class) at run time. Problems encountered when using prior art content management solutions for code isolation are addressed, as are problems encountered in clustered server environments. These environments will now be described.

A content management solution, such as the WebSphere® Portal Content Publishing ("WPCP") solution from International Business Machines Corporation ("IBM"), allows developers to create a "working copy" of code under revision. ("WebSphere" is a registered trademark of IBM in the United States, other countries, or both.)A "workspace" paradigm is typically used, whereby a virtual area referred to as a workspace is assigned to a particular developer or a set of developers. The workspace may exist on the developer's local computer, or it may be located on network-accessible storage of a content management server. When the developer is ready to revise a code component, he or she places a copy into his/her workspace. That copy is then used for making the revisions, while the base version of the code component remains available to other users (and/or to other developers not using this workspace). Once the revisions have been completed, the working copy from the workspace can be used to replace the base version of the code component, such that all users can now access this replacement. (This replacement of the base version is typically referred to as "promoting" the revision.)

Isolation techniques typically differ for application data, dynamic content creation components (such as scripts), and compilable code. The first related invention discusses code compilation techniques when a different version of code may be located in a workspace, and the second related invention discusses use of scripts that may have a different version located in a workspace. The present invention addresses run-time loading of code components where a particular code component to be loaded may have more than one version; those versions may be located in one or more workspaces.

Prior art techniques for isolation in content management solutions that operate in distributed computing environments may be achieved at the application level or project level using Java class loaders. For example, WPCP provides isolation at a per-project level by placing class files used within a project of a Web application on the authoring system, and using a project class loader to resolve class references during execution. WPCP also provides isolation at the workspace level, whereby the project-level isolation for data and JavaServer™ Page ("JSP"™) execution can be further refined to the workspace(s) within a particular project. This workspace isolation comprises serving the data and JSPs from the project database. Classes, on the other hand, are not part of this prior art workspace isolation technique: classes are served from the file system. ("JavaServer" and "JSP" are trademarks of Sun Microsystems, Inc.)

Other approaches to isolation in distributed content management systems are known. Existing solutions provide workspace isolation of data using file system mechanisms. To isolate classes or code at the workspace level, content management systems are known that define a separate Web application for each workspace and then use the standard Java application isolation support within each of these applications. For example, if a developer "Alan" wishes to modify a set of Java classes for use by application "ABC", Alan copies those classes into a uniquely-named version of the application, such as "ABC_Alan". If another developer "Bob" wishes to edit some of those same classes simultaneously, then Bob copies the appropriate ones of the original classes into a different version of the application, which might be named "ABC_Bob". This approach of using separate Web applications results in a relatively large amount of overhead, however, and limits the number of usable workspaces that can be established.

In addition to these drawbacks of existing content management solutions, other problems arise when the underlying storage mechanism for classes is a file system. This may occur not only in content management scenarios, but also when classes from the file system need to be used in a clustered server environment (e.g., a distributed computing environment where servers may be geographically distributed). In this clustered server environment, the class files must be replicated among the file systems of the dispersed servers. This requirement for replication entails burdens on systems management personnel as well as increased system overhead.

Embodiments of the present invention provide workspace isolation of classes within a project. Classes are stored within a database when using preferred embodiments, where this database may be the database used by the content management solution for content isolation. By serving the classes from a database at run time, rather than attempting to locate them in a file system, the classes become accessible on a broad basis without a requirement for replication to multiple sites or servers. Thus, a developer "Carla" may have code revisions in her workspace "C" while developer "Diana" has different code revisions (to the same or different code) in her workspace "D". During execution, Carla's code will invoke the revised versions of the code components in her workspace "C", while Diana's executing code will invoke the revisions in her workspace "D". End users, by contrast, will load and invoke the unrevised or base versions of the code components. (Similarly, other developers not working in either workspace C or D or another workspace that modifies these code components will also invoke the base versions.)

According to preferred embodiments, a class loader loads and resolves classes by reading the appropriate class files (i.e., the revised version or the base version) from the authoring system database—instead of from the file system. Preferably, the class loader is associated with a specific workspace and is cached for the life of the workspace. Class loaders are preferably created on demand, such that only active workspaces will have class loaders.

It should be noted that while preferred embodiments are discussed herein in terms of an application (such as a Web shopping application) being divided by projects and those projects being divided by workspace, in alternative embodiments, the class loader scope may apply to a structure that is not based on the workspace paradigm. In these alternatives, the class loader scope preferably applies to the lowest-level organization for which isolation of code components is desirable. For example, embodiments of the present invention may be used advantageously for loading classes from a database when content is managed on a per-project level, thereby providing isolation support in a distributed computing environment.

Figure 2:
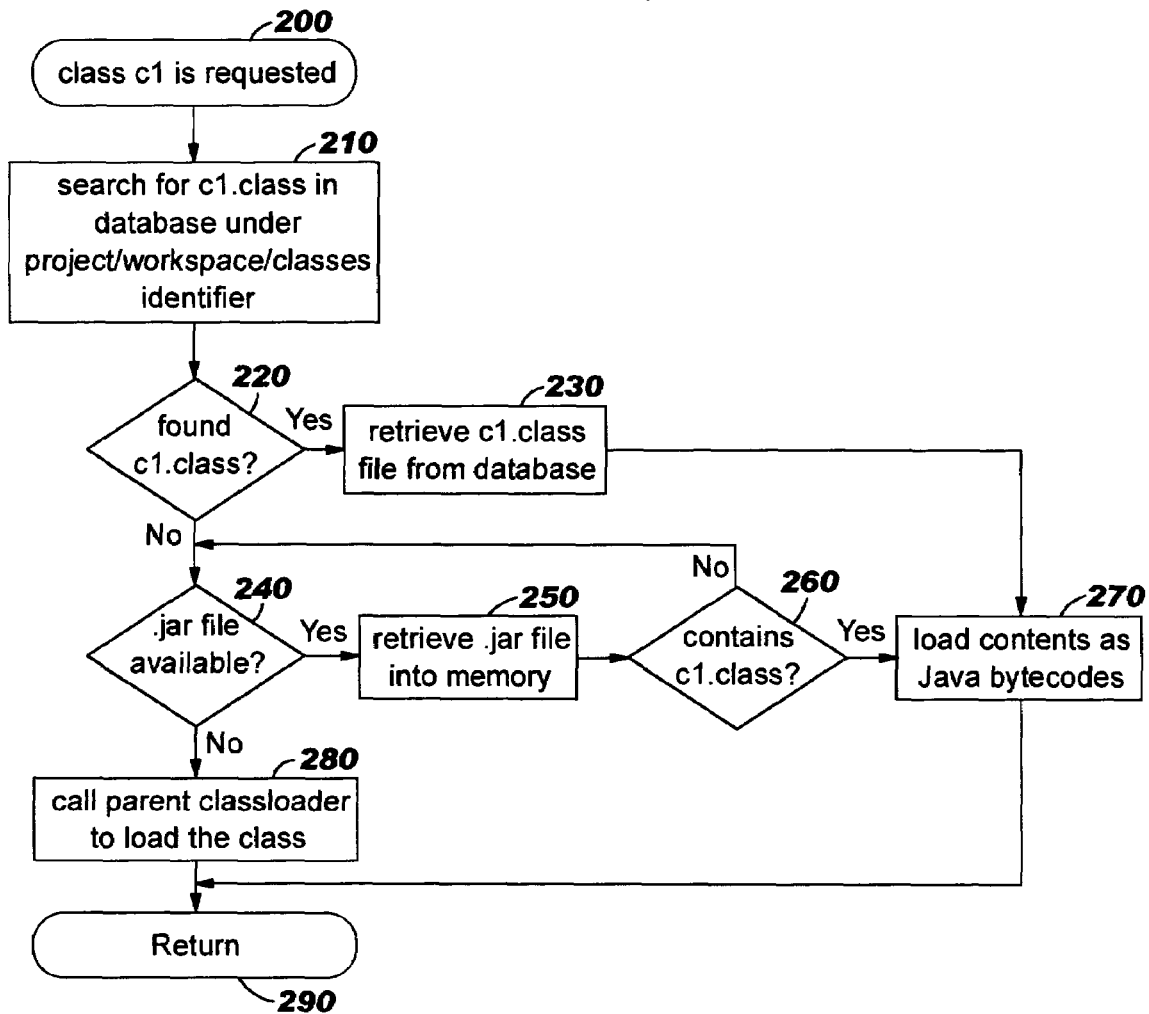
FIG. 2 provides a flowchart setting forth logic which may be used to provide dynamic loading of code components according to preferred embodiments of the present invention.

Turning now to FIG. 2, a flowchart is presented that depicts logic which may be used when implementing preferred embodiments. This processing begins at Block 200 when a class, designated in the flowchart as class "cl", is requested by an executing program. A search is then made (Block 210) for the compiled version of that class, designated "cl .class" in the example, in the database. Preferred embodiments use the workspace-based structure shown in Block 210 during this search, whereby the target of the search is formed from an identifier that reflects checking the classes for the presently-applicable workspace within the presently-applicable project. For example, if a developer is working on a project to revise the checkout processing of a Web shopping application and is using a workspace "C", the identifier might be formed as "checkout/C/classes". By contrast, when code for a developer using a different workspace is to be loaded, Block 210 will search in a different target location that reflects that workspace. (Note that a workspace may be used by more than one developer. Typically, a user chooses a workspace when selecting to perform a particular task within a content management system, and a user context is then associated with that workspace for the task duration.) The workspace-specific loading thus operates in a transparent and automated manner.

Block 220 tests whether cl .class was located (i.e., whether the compiled class exists in the presently-applicable workspace). If so, then Block 230 retrieves that class, after which Block 270 loads the contents from the database as Java bytecodes. (Typically, different methods will be used for accessing classes from a database versus from a file system.)

Control reaches Block 240 when the test in Block 220 has a negative result. Block 240 tests to see whether there are any .JAR files (or other types of archive files, as appropriate) available. If so, Block 250 retrieves one of these .JAR files into memory, and Block 260 checks to see whether the searched-for class is located in that .JAR file. If it is not, control returns to Block 240 to determine whether there are any more .JAR files that can be searched.

Preferred embodiments use the workspace-based structure for storing .JAR files in the database checked at Block 240, such that the target of the search is formed from an identifier that reflects checking a library of .JAR files for the presently-applicable workspace within the presently-applicable project. With reference to this example wherein a developer is working on a project to revise the checkout processing of a Web shopping application and is using workspace "C", this identifier might be formed as "checkout/C/library".

When the test at Block 260 has a positive result (i.e., the searched-for class was successfully located in a .JAR file), control then transfers to Block 270 where the class file is loaded from the database. Control then returns to the invoking program by transferring to Block 290.

If the test at Block 240 has a negative result, indicating that there are no further .JAR files in which to search for the needed class, control reaches Block 280, where the class loader hierarchy of the invoking class (i.e., the class that is requesting invocation of class cl) is called. Preferably, this operates as in the prior art, whereby the class loaders in the inheritance chain are used and if necessary, the class path variable is consulted (as has been discussed with reference to FIG. 1).

While the flowchart in FIG. 2 provides logic for checking .JAR files, additional logic may be added for checking other groupings of code components, such as .ZIP files into which multiple Blocks 240-260

Thus, it can be seen that use of embodiments of the present invention enables resolving the location, at run time, of code components even though code isolation is used. Furthermore, embodiments of the present invention improve operation in clustered server environments because code components are now available from a network-accessible database, rather than from a file system. As one example of an advantageous use of the present invention, an application undergoing revision can be distributed on a project basis, such that developers who are geographically dispersed can contribute revisions for their project yet can have those revisions isolated until development and testing thereof has completed (after which the revised version may be promoted to replace the commonly-accessible base version). Use of the present invention is not, however, limited to content management.

As will be appreciated by one of skill in the art, embodiments of the present invention may be provided as (for example) methods, systems, and/or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of dynamically loading code components in a workspace environment, comprising:

associating a distinct class loader with each of a plurality of workspaces in which code components are being revised;

determining, during run time, that executing code references a selected one of the code components that is not yet loaded; and loading the referenced code component for execution, further comprising:

forming a search target comprising an identifier associated with a currently-applicable one of the workspaces and an identifier of the referenced code component;

using the search target, by a selected one of the class loaders that is associated with the currently-applicable one of the workspaces, to search for a compiled version of the referenced code component in a database location associated with the identifier of the currently applicable workspace; and if the using locates the compiled version of the referenced code component in the database location associated with the identifier of the currently-applicable workspace, loading the located compiled version of the referenced code component from the database location using the selected one of the class loaders, otherwise using a class loader associated with the executing code to load a base compiled version of the referenced code component from a different location that is not associated with the identifier of the currently-applicable workspace.

2. The method according to claim 1, wherein the code components comprise class files.

3. The method according to claim 1, wherein the different location is a file system location accessed by consulting a class path variable associated with the referenced code component.

4. A system for dynamically loading code components in a workspace environment, comprising:

a computer comprising a processor; and instructions which execute using the processor to implement functions comprising:

associating a distinct class loader with each of a plurality of workspaces in which code components are being revised;

determining, during run time, that executing code references a selected one of the code components that is not yet loaded; and loading the referenced code component for execution, further comprising:

forming a search target comprising an identifier associated with a currently-applicable one of the workspaces and an identifier of the referenced code component;

using the search target, by a selected one of the class loaders that is associated with the currently-applicable one of the workspaces, to search for a compiled version of the referenced code component in a database location associated with the identifier of the currently-applicable workspace; and if the using locates the compiled version of the referenced code component in the database location associated with the identifier of the currently-applicable workspace, loading the located compiled version of the referenced code component from the database location using the selected one of the class loaders, otherwise using a class loader associated with the executing code to load a base compiled version of the referenced code component from a different location that is not associated with the identifier of the currently-applicable workspace.

5. The system according to claim 4, wherein the code components comprise class files.

6. The system according to claim 4, wherein the different location is a file system location accessed by consulting a class path variable associated with the referenced code component.

7. A computer program product for dynamically loading code components, wherein the computer program product is embodied on one or more computer-usable storage media and comprises computer-usable program code for:

associating a distinct class loader with each of a plurality of workspaces in which code components are being revised;

determining, during run time, that executing code references a selected one of the code components that is not yet loaded; and loading the referenced code component for execution, further comprising:

forming a search target comprising an identifier associated with a currently applicable one of the workspaces and an identifier of the referenced code component;

using the search target, by a selected one of the class loaders that is associated with the currently-applicable one of the workspaces, to search for a compiled version of the referenced code component in a database location associated with the identifier of the currently-applicable workspace; and if the using locates the compiled version of the referenced code component in the database location associated with the identifier of the currently-applicable workspace, loading the located compiled version of the referenced code component from the database location using the selected one of the class loaders, otherwise using a class loader associated with the executing code to load a base compiled version of the referenced code component from a different location that is not associated with the identifier of the currently-applicable workspace.

8. The computer program product according to claim 7, wherein the code components comprise class files.

9. The computer program product according to claim 7, wherein the different location is a file system location accessed by consulting a class path variable associated with the referenced code component.

* * * * *

UNITED STATES PATENT AND TRADEMARK OFFICE
CERTIFICATE OF CORRECTION

PATENT NO. : 7,603,666 B2  Page 1 of 1
APPLICATION NO. : 10/869129
DATED : October 13, 2009
INVENTOR(S) : McPherson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 754 days.

Signed and Sealed this

Fourteenth Day of December, 2010

David J. Kappos
*Director of the United States Patent and Trademark Office*